United States Patent Office 3,325,301
Patented June 13, 1967

3,325,301
RECOVERY OF CARBON BLACK FROM AQUEOUS SLURRIES THEREOF CONTAMINATED WITH POLYCYCLIC HYDROCARBON PYROLYSIS PRODUCTS
Frederick Denis Carter, Cheltenham, England, assignor to Jones Gas Process Company Limited, Royal Crescent, England
No Drawing. Filed Sept. 16, 1963, Ser. No. 309,290
9 Claims. (Cl. 106—307)

This invention relates to the treatment of industrial aqueous pastes or slurries of carbon black in order to provide carbon black in a dry condition in which it is suitable for industrial application.

Some carbon blacks, as ordinarily produced, for example in the gas industry as a by-product of the gasification of oil or the reforming of methane, or in the carbon black industry itself, are contaminated to a substantial extent, e.g., to the extent of up to 6% of their weight, with polycyclic hydrocarbon pyrolysis products of relatively high molecular weight. The so-called "staining blacks" are of this type, i.e., the thermal blacks, lamp-blacks, semi-reinforcing and certain other lower grade furnace blacks. These contaminated blacks are unsuitable for certain applications, such as in the rubber trade, for instance, since the contaminant tends to produce undesirable effects such as "blooming" and "bleeding" from vulcanisates. Such disadvantages are fully appreciated by those versed in the trade and various means have been suggested for completely removing these inherent organic contaminants. One such method involves calcination of the carbon, but this results in a polymerisation of some of the organic compounds, rather than their removal, and oxidation of the carbon surface, such that the rubber compounding characteristics of the carbon are completely changed. Another method utilises solvent extraction of the dry carbon, but this gives rise to a thixotropic filter cake of poor drying characteristics and the product is again altered as regards its dispersability and other qualities in rubber, the carbon being said to possess a "harshness," which is undesirable.

It is therefore an object of the present invention to provide a process which will enable one to obtain from an aqueous paste or slurry of carbon black contaminated with inherent polycyclic hydrocarbon pyrolysis products, a dry dustless granular carbon black of reduced contamination.

The invention is based on the discovery that such a product can be obtained from an aqueous paste or slurry of carbon black containing between 0.8% and 6.0% of inherent polycyclic hydrocarbon pyrolysis products by a process which comprises intimately admixing with the paste or slurry, if necessary with the addition of further water, a controlled amount of a second liquid which is volatile and substantially immiscible with water and possesses a higher adhesion tension than water for the carbon black, so as to displace and replace the water initially wetting the surface of carbon black particles in the paste or slurry and to form the carbon black into granules, draining off from the granules, the maximum amount of the displaced water and of any added water which will drain off under gravity alone, evaporating the said second liquid together with co-evaporating water, evaporating such further portion of the water that the residue contains between 15% and 30% by weight of water, extracting the residue using a volatile hydrocarbon solvent or solvent mixture which is either free of or contains less than 50% by weight of aromatic or chlorinated hydrocarbon, until the polycyclic hydrocarbon content of the carbon black has been selectively reduced to between 0.4% and 1.4% by weight, then evaporating the residual solvent together with co-evaporating water and finally completing the drying process from water at a temperature below 100° C. and in the absence of air.

Carbon black pastes or slurries to which the invention can be applied are obtained, in industry, by the washing of streams of gas containing carbon black and organic pyrolysis products. As mentioned above, the process of the invention is applicable to pastes and slurries which contain between 0.8% and 6.0% by weight of hydrocarbon pyrolysis products and, in carrying out the process of the invention, one or more solvent extractions may be required, depending upon the initial content of contaminants.

The invention makes it possible to obtain from such inherently contaminated carbon black pastes and slurries, a dustless granular carbon black product which is substantially free from undesirable highly coloured migratory fractions of the original contaminants.

Moreover, the invention makes it possible to obtain, from such contaminated pastes or slurries, carbon black which can be used in rubber technology, without giving rise to the effects of "blooming" and "bleeding" as referred to above.

It has been found that in the process defined above the carbon black granules, produced by treatment with the second liquid, are held together not only by physical attraction between the minute ultimate particles of the carbon black when these are brought close together by the combined effect of the intimate admixing and the action of the second liquid, but also by the presence of the inherent hydrocarbons and it has also been found that such granular form may be maintained throughout the remainder of the process and in the final product provided that at any stage the quantity mentioned, of at least 0.4 part by weight of the (lesser-soluble) contaminant hydrocarbons per 100 parts of carbon are retained. Partial selective solvent extraction of the contaminants as carried out in the process of the invention thus affords major advantages over complete extraction. I have discovered that this partial selective extraction also has further important advantages regarding the rubber compounding of the carbon product in that the residual organic compounds purposely left in the carbon, being now less migratory and insufficient to cause the defects of "blooming" and "bleeding," nevertheless have a pronounced effect on the rubber compounding properties of the vulcanisates. They lead, for instance, to a lowering of modulus and an increase in tear strength and resilience properties.

Thus the invention enables the production of carbon blacks, in dry dustless granular form, which possess advantageous rubber compounding properties, arising from the residual organic matter.

When carbon blacks are removed from a production gas stream by washing or wet scrubbing, the drying of the pastes produced is a costly procedure, so much so that hitherto they have often been considered as waste materials and their disposal has presented a difficult problem. Where these pastes represent only a minor fraction of the total carbon black produced, they may be mixed with the main dry fraction in a wet pelletisation process. However, this procedure forces the manufacturer to operate his furnaces in such a way that even the paste fraction is not appreciably contaminated with organics (e.g. under 0.2%). The process of the present invention facilitates disposal of the paste, without the necessity of mixing it with the main dry-collected carbon, either by recycling the paste through the hot zone of the generator or by wet pelletisation. The manufacturer, as will be appreciated, is thus left free to operate his furnaces at higher conversion efficiencies (i.e. at lower temperatures and/or using less air) to provide a greater yield of both dry and wet collected products.

In the specification of my British Patent No. 741,135, I have described a process for de-watering of aqueous pastes or slurries of fine-particle hydrophobic solids comprising intimately admixing with the paste or slurry, if necessary with the addition of further water, a controlled amount of a second liquid which is volatile, substantially immiscible with water and which possesses a higher adhesion tension than water for the solid, to displace the maximum amount of water, and any added water, therefrom, separating the solid from the displaced water and then evaporating said second liquid and the relatively small amount of remaining entrained water from the solid to complete the drying process.

The aforesaid treatment may be applied to the dewatering of pastes or slurries of carbon black. Very fine powders, such as carbon black, form thixotropic slimes when mixed with water or with organic solvents and the solvent extraction of such powders was previously considered an impracticable proposition from the industrial stand-point. The process of British Patent No. 741,135 provides a technique for granulating such pastes or slurries and, by an analogous technique, the process of the present invention enables granular carbon black of reduced contamination to be obtained. However, it will be noted that, in accordance with the present invention, after the evaporation of the second liquid, together with an azeotropic amount of water, the whole of the remaining water is not evaporated in one step to complete the drying process, but rather a controlled portion is evaporated until the residue contains between 15% and 30% (preferably between 18% and 24%) by weight of water. At this stage, solvent extraction intervenes, followed by azeotropic recovery of the solvent, while still leaving sufficient water for the final drying step to be from water only, as is the case with the process of British Patent No. 741,135.

The second liquid used in the treatment described in British Patent No. 741,135 may be an aromatic, paraffinic or naphthenic hydrocarbon or chlorinated derivative thereof, or a natural or synthetic mixture of same, toluene being the liquid of choice. It is found that, if an aromatic solvent, or a chlorinated hydrocarbon solvent such as trichlorethylene is used in the process of the present invention, such liquid has so high a solubility for the contaminant organic compounds that the granular form of the carbon is lost and the material becomes difficult, if not impossible, to process further. However, others of the aforesaid types of water-immiscible volatile liquid show a selective solvent activity so that while a substantial part of the total contaminants are extracted, this part comprises the more highly coloured migratory components, and the remaining undissolved relatively light coloured components are sufficient to hold the carbon together in granular form.

The functions of the de-watering liquid and the extraction solvent are different, but it is possible to select a liquid or mixture of liquids which will satisfactorily effect both functions, thus simplifying plant design and leading to optimum results. Thus, for example, by using a mixture of toluene (25) and n-heptane (75) it is possible to effect the preferential extraction of the highly coloured organic contaminants which are primarily responsible for the bloom developed when the carbon is used for rubber compounding, and also to obtain a substantial extraction of those contaminants which are responsible for bleeding from its rubber compoundings into adjacent white vulcanisates. Moreover, I have discovered that the granular form of the carbon black, produced by the treatment of the paste or slurry using this mixture as the said second liquid, is retained during solvent extraction with this same mixture, provided the extraction is effected after the liquid used for the granulating step and part of the water remaining after draining the granules has been evaporated and provided the granules still contain more than 15% and less than 30% of occluded water. This range of moisture content at the solvent extraction stage also enables the final drying to be from water and not from solvent.

The present invention therefore provides conditions for the selective partial extraction of organic contaminants from carbon pastes within a drying process, such that this is applied at the discovered ranges of moisture content of the carbon, of inherent polycyclic hydrocarbon content and of aromaticity of the solvent, within which granule breakdown is avoided. At the same time the process incidentally introduces a second drying stage in which the solvent is aiding the removal of water by co-distillation, thus further improving the overall drying technique.

Broadly speaking, the solvent employed for the selective partial extraction should comprise volatile hydrocarbons. However, the content of aromatic hydrocarbons plus chlorinated hydrocarbons (if any) must not exceed 50% by weight and should preferably not exceed 25%. It has been found that 10 to 25% is most suitable.

A content of at least 0.8% of inherent solid polycyclic hydrocarbon contaminant in the carbon black paste or slurry is sufficient to provide the initial content necessary to afford adequate granule strength before, during and after the solvent extraction. The minimum number of solvent extraction steps which may be employed is one, which will not reduce an initial inherent polycyclic hydrocarbon content of 0.8% to below a residual content of 0.4%. Contents above about 6% are generally uneconomic to work, since a large number of batchwise extractions is then necessary, to reduce the residual content to below 1.4%.

It has been found that if the water content of the carbon black at the solvent extraction stage exceeds 30% or is less than 15%, there is breakdown of the granular structure and reversion to a thixotropic slurry phase. Outside this discovered range of water content breakdown occurs even with a completely non-aromatic solvent and/or even when the granules contain appreciable amounts of inherent solid polycyclic hydrocarbons. A water content at the solvent extraction stage of 18 to 24% is preferred.

The following examples, in which all parts and percentages are given on a weight basis, will serve to illustrate the invention:

EXAMPLE 1

Thermal carbon black having a solid organic contaminant content of 3.3% (i.e. the benzene-soluble content on a dry basis) in the form of a paste containing 87% water, was diluted with water to a water content of 93.75% and then de-watered and brought into granular form by treatment with 51% of the weight of its carbon content, of a petroleum fractioin, boiling at about 110° C. and having an aromatic hydrocarbon content of 10%. The water phase was then drained away leaving a product containing, per 100 parts of the original contaminated carbon black:

| | Parts |
|---|---|
| Carbon | 96.7 |
| Organic contaminant | 3.3 |
| Petroleum fraction | 51 |
| Water | 37.5 |

This product was indirectly heated in an enclosed vessel, fitted with a vapour condenser, to distil off the petroleum which carries with it azeotropically some of the water. After the petroleum fraction had been recovered, a further amount of water was distilled off under vacuum to reduce the water content to 21 parts. The residue was then treated, whilst warm, with 170 parts of the same petroleum fraction, drained and treated with a further 300 parts of the petroleum fraction batchwise in three equal amounts of 100 parts, with draining after each solvent extraction step. The residual product consisted at this stage of:

| | Parts |
|---|---|
| Carbon | 96.7 |
| Organic contaminant | 0.8 |
| Petroleum fraction | 70 |
| Water | 21 |

This product was reheated in the same way as before, in the absence of air and, since the mixture of the petroleum fraction and water again boils azeotropically at about 85–100° C., the whole of the petroleum fraction (70 parts) and about 14 of the 21 parts of water content were thus removed. A final drying from water was effected in vacuo under agitation, when a final moisture content of 0.2–0.5% was attained.

The granular condition of the carbon resulting from the first treatment with the petroleum fraction was maintained throughout the entire sequence of steps, but the content of organic contaminant was reduced, as shown above, from an original 3.3% to a value of 0.8%. The removal of the organic contaminant is selective so that, while those products which cause "blooming" and "bleeding" are removed, the residual organic contaminant is actually advantageous in rubber compounding by facilitating the incorporation of the carbon black, acting as a softener and as a "wetting" agent between the carbon black and the rubber, lowering the modulus and raising the tear resistance, resilience and other like properties of the vulcanisate.

EXAMPLE 2

The procedure of Example 1 was followed to the stage of yielding a granular product consisting of:

| | Parts |
|---|---|
| Carbon | 96.7 |
| Organic contaminant | 3.3 |
| Petroleum fraction | 51 |
| Water | 37.5 |

This product was diluted with an additional 200 parts of water, boiled to remove the petroleum fraction and some of the water, and drained. The product then consisted of:

| | Parts |
|---|---|
| Carbon black | 96.7 |
| Organic contaminant | 3.3 |
| Petroleum fraction | Nil |
| Water | 37.5 |

Whilst still hot, the batch was submitted to a vacuum distillation to reduce the water content to 21 parts, at which stage the product possessed the same preferred presolvent extraction composition as in Example 1.

This product was then solvent-extracted as in Example 1 yielding, as in that example, a product consisting of:

| | Parts |
|---|---|
| Carbon black | 96.7 |
| Organic contaminant | 0.8 |
| Petroleum fraction | 70 |
| Water | 21 |

This product was reheated in the same way as in Example 1 so as first to recover the petroleum fraction and then to complete the drying from water in vacuo.

It may be observed that in the alternative presolvent extraction procedure of Example 2, the original granular form of the carbon, which results from the de-watering treatment, is retained even in the absence of the petroleum fraction and even on being boiled in water, by virtue of the organic contaminant which is present in the original granular form in excess of 0.8%. In this connection it should be noted that in the absence of the organic contaminant the granules would break down on being boiled in water.

I claim:

1. A process for obtaining from an aqueous slurry of carbon black having a solids concentration of up to 12% by weight and contaminated with 0.8% to 6.0% of inherent polycyclic hydrocarbon pyrolysis products, dry dustless granular carbon black of selectively reduced contamination, which comprises intimately admixing with the slurry a controlled amount of a second liquid which is volatile and substantially immiscible with water and possesses a higher adhesion tension than water for the carbon black, so as to displace and replace the water initially wetting the surface of carbon black particles in the slurry and to form the carbon black into granules, draining off from the granules the maximum amount of the displaced water which will drain off under gravity alone, evaporating the said second liquid together with co-evaporating water, evaporating such further portion of the water that the residue contains between 15% and 30% by weight of water, extracting the residue using a solvent which comprises volatile hydrocarbons and the total aromatic and chlorinated hydrocarbon content of which is no greater than 50% by weight, until the polycyclic hydrocarbon content of the carbon black has been selectively reduced to between 0.4% and 1.4% by weight, then evaporating the residual solvent together with co-evaporating water and finally completing the drying process from water at a temperature below 100° C. and in the absence of air.

2. A process according to claim 1, wherein the said solvent is free of aromatic and chlorinated hydrocarbons.

3. A process according to claim 1, wherein the said residue which is subjected to extraction with the said solvent contains between 18% and 24% by weight of water.

4. A process according to claim 1, wherein the said second liquid and the said solvent are identical.

5. A process for obtaining from an aqueous slurry of carbon black having a solids concentration of up to 12% by weight and contaminated with 0.8% to 6.0% of inherent polycyclic hydrocarbon pyrolysis products, dry dustless granular carbon black of selectively reduced contamination, which comprises intimately admixing with the slurry a controlled amount of a second liquid which is volatile and substantially immiscible with water and possesses a higher adhesion tension than water for the carbon black, so as to displace and replace the water initially wetting the surface of carbon black particles in the slurry and to form the carbon black into granules, draining off from the granules the maximum amount of the displaced water which will drain off under gravity alone, evaporating the said second liquid together with co-evaporating water, evaporating such further portion of the water that the residue contains between 15% and 30% by weight of water, extracting the residue using a solvent which comprises a mixture of volatile hydrocarbons and the total aromatic and chlorinated hydrocarbon content of which solvent is no greater than 50% by weight, until the polycyclic hydrocarbon content of the carbon black has been selectively reduced to between 0.4% and 1.4% by weight, then evaporating the residual solvent together with co-evaporating water and finally completing the drying process from water at a temperature below 100° C. and in the absence of air.

6. A process according to claim 5, wherein the total aromatic and chlorinated hydrocarbon content of the solvent is between 10% and 25% by weight.

7. A process according to claim 5, wherein the said second liquid and the said solvent are identical, each comprising a mixture of toluene and n-heptane.

8. A process for obtaining dry dustless granular carbon black of selectively reduced contamination from an aqueous slurry of carbon black which has a solids concentration of up to 12% by weight, is contaminated with 0.8% to 6.0% of inherent polycyclic hydrocarbon pyrolysis products, and is obtained by washing a gas stream containing carbon black and organic pyrolysis products, which process comprises intimately admixing with the slurry a second liquid which is volatile and substantially immiscible with water and possesses a higher adhesion tension than water for the carbon black, so as to displace and replace the water initially wetting the surface of carbon black particles in the slurry and to form the carbon black into granules, draining off from the granules the maximum amount of the displaced water which will drain off under gravity alone, evaporating the said second liquid together with co-evaporating water, evaporating such further portion of the water that the residue contains between 15% and 30% by weight of water, extracting the residue using a solvent which comprises volatile hydrocarbons and the total aromatic and chlorinated hydrocarbon content of which is no greater than 50% by weight, until the polycyclic hydrocarbon content of the carbon black has been selectively reduced to between 0.4% and 1.4% by weight, then evaporating the residual solvent together with co-evaporating water and finally completing the drying process from water at a temperature below 100° C. and in the absence of air.

9. A carbon black product in dry dustless granular form, when obtained by the process according to claim 8.

References Cited
UNITED STATES PATENTS

Re. 22,454   3/1944   Wiegand et al. _____ 23—209.2
3,042,504   7/1962   Carter _____ 23—314

OSCAR R. VERTIZ, *Primary Examiner.*

EDWARD J. MEROS, *Examiner.*